United States Patent Office 3,543,026
Patented Nov. 24, 1970

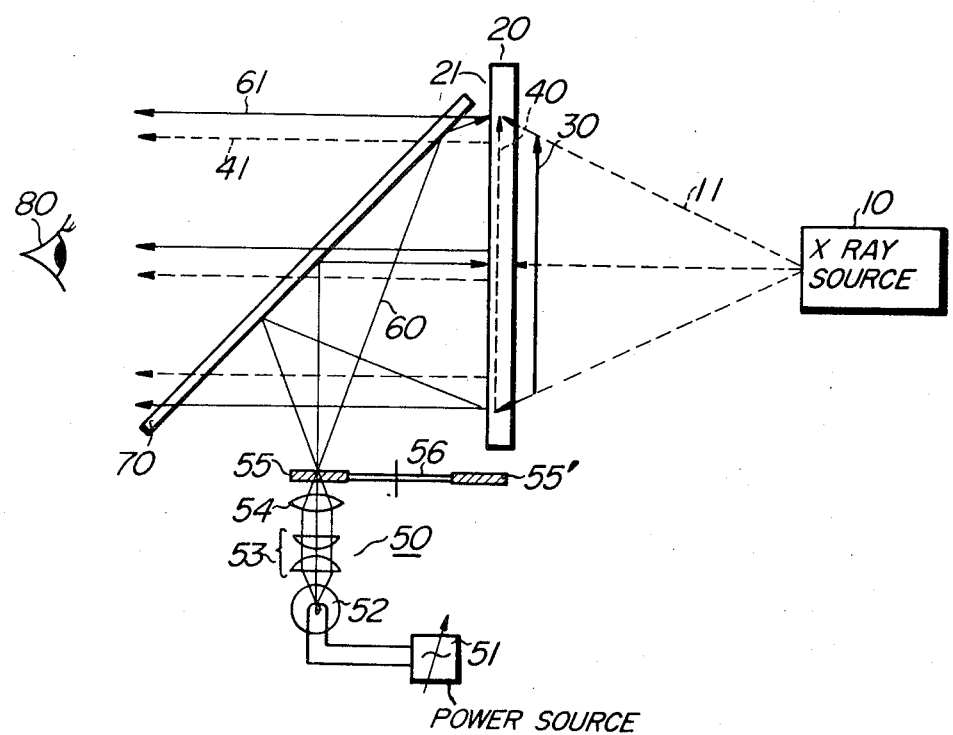

3,543,026
DEVICE FOR CONVERTING CONTRAST OF X-RAY IMAGE INTO COLOR DIFFERENCE WITH INTENSIFIED BRIGHTNESS
Tadao Kohashi, Yokohama, and Kazunobu Tanaka and Norio Suzuki, Kawasaki-shi, Japan, assignors to Matsushita Electric Industrial Co., Ltd., Osaka, Japan, a corporation of Japan
Filed Oct. 18, 1968, Ser. No. 768,748
Claims priority, application Japan, Oct. 26, 1967, 42/70,057
Int. Cl. G01d 7/06
U.S. Cl. 250—77            6 Claims

ABSTRACT OF THE DISCLOSURE

A device for converting an X-ray image for the observation of the same having X-ray image conversion and display means and light source means for biasingly illuminating the display surface of the X-ray image conversion and display means with a beam of light bearing a color which differs from the color emitted from the display surface. In the device, a converted visible image responsive to an X-ray image is superposed by the biasing light of a color which differs from the color emitted from the converted image so that the visible image has an increased mean brightness and its contrast is converted into a variation in color which can very distinctly be observed.

---

This invention relates to a device for converting an X-ray image into a visible optical image for the observation of the same.

Conventional devices for converting an X-ray image into a visible optical image for displaying the same for the sake of visual observation employ generally an X-ray sensitive fluorescent screen and the like. However, these conventional devices have commonly a very poor conversion efficiency. Especially, in the device adapted for medical usage, the rate of X-ray dosage applied to an object such as a human body is kept at a very low value in view of a possible impediment imparted to the human body by the X-rays. Since the visible optical image obtained by the conversion with such a low dosage rate is extremely dark, a long time is required until the eye is adapted to properly observe the image.

On the other hand, the human body has an extremely high transparency to X-rays. In view of such a high transparency to the X-rays, a visible optical image obtained by the conversion of an X-ray image has a very low contrast, which, in conjunction with a very low mean brightness level of the visible optical image makes it very difficult to detect a defect existing in the object.

It is therefore a primary object of the present invention to provide a novel and improved device for converting an X-ray image into a visible image for the observation of the same, which device overcomes the defects encountered with conventional devices of this kind.

In accordance with the present invention, there is provided a device for converting an X-ray image for the observation of the same which comprises means for converting an X-ray image into a visible image and displaying the converted visible image on its display surface, and light source means for biasingly illuminating the image display surface with a beam of light bearing a color which differs from the color emitted from the display surface.

The biasing illumination according to the present invention is so effective that the converted visible optical image has an improved mean brightness level and the relative intensity, hence the contrast of the converted visible optical image can be displayed as a variation in color thereby facilitating close observation.

The above and other objects, features and advantages of the present invention will be apparent from the following description taken in conjunction with the accompanying drawing, in which the sole figure is a block diagram of a preferred embodiment of the device according to the present invention.

Referring to the figure, the device comprises an X-ray source 10 and means such as X-ray sensitive fluorescent screen 20 for converting an X-ray image into a visible optical image and displaying the image on its display surface 21. The fluorescent screen 20 has a coating of a fluorescent material such as ZnCdS:Ag which emits green light when bombarded by the X-rays 11 which are transmitted through an object 30 such as a human body. Those portions of the fluorescent screen 20 that are struck by the transmitted X-rays fluoresce to form a converted visible optical image 40 with green emission.

The device further comprises a source of colored light 50 which includes a power source 51 generating a variable voltage, a light source 52 such as an incandescent lamp connected with the power source 51, a condenser lens system 53, a projecting lens 54, and a color filter 55 such as a red filter for obtaining a biasing light 60 of a color which differs from the green color emitted by the fluorescent screen 20. A half mirror 70 of lead glass having a protective effect against X-rays is used for the biasing illumination of the fluorescent screen 20 with the rays of the colored light 60 with a substantially uniform intensity.

The converted visible light 41 of green color produced by excitation with the X-rays 11 is thus superposed by the light 61 of red color produced due to the reflection of the biasing light 60 by the half mirror 70, and the composite light can be observed by the eye when the display surface 21 is viewed by the eye from a position 80. In other words, the converted visible optical image 40 of green color having a relative density distribution of color is superposed by the reflected biasing light 61 of red color having a fixed illumination, and such an image can be observed through the half mirror 70.

Consider now the color of a local area of the converted visible optical image 40 displayed on the display surface 21. It is then apparent that the color which is observed is a compound color which is defined by the ratio of the intensity of the reflected biasing light 61 of red color having the fixed illumination to the intensity of the converted visible light 41 of green color having a fixed relationship with the intensity of the transmitted X-rays modulated depending on the transparency of the object 30 to the X-rays 11. Therefore, the color of dark portions of the converted visible optical image 40 is determined by the intensity of the biasing light 60 which intensity may be suitably selected by adjusting the voltage supplied from the power source 51. More precisely, the dark portions of the converted visible optical image 40 will be red which is the color possessed by the biasing light 60 and will become red orange, orange, yellow orange, yellow, green yellow, yellow green and yellowish green at those portions where the intensity of green relative to the intensity of red becomes successively stronger. In the ideal state in which the converted visible optical image 40 is sufficiently bright, its highlight portions bear the green color because the converted visible light of green is predominant at such portions. That is, the relative brightness, hence the contrast of the converted visible optical image 40 can be observed as a variation in color.

A visible optical image obtained by the conversion of an X-ray image has generally an extremely low contrast due to the fact that X-rays have a high degree of penetrability through an object, and because of the high penetrability of X-rays, it is extremely difficult to distinguish a defect from other portions of the object since the defect has a relative brightness which differs only slightly from the relative brightness of other portions of the object.

According to the present invention, however, a slight variation in the relative brightness can be emphasized as a variation in color and thus the image can be distinctly observed. Furthermore, the biasing illumination acts to increase the quantity of light rays by an amount which is sufficient to stimulate the optic nerve.

Generally, the sensitivity of detection by observation with the eye shows an outstanding increase with an increase in the quantity of light rays when the observation is made on a screen such as an X-ray sensitive fluorescent screen which gives such a dark luminescence as barely by the organ of vision.

It will be understood that the present invention which increases substantially the intensity of a converted visible optical image and display the variation in contrast as a corresponding variation in color makes it possible to remarkably easily detect a defect, the internal structure or the like of an object.

The color observed by the eye is dependent upon the ratio of the intensity of the converted visible light 41 to the intensity of the reflected biasing light 61. Therefore, the color can freely be adjusted when the power source 51 generating a variable voltage is manipulated for the adjustment of the intensity of the biasing light 60. Further, the image can be displayed with a compound color different from the compound color described above when, for example, the red filter 55 is replaced by a blue or other color filter so as to vary the color of the biasing light 60. For example, a plurality of filters including a blue filter 55' may be mounted together with the red filter 55 on a rotary disc 56 and the rotary disc 56 may be suitably turned to give a biasing light 60 of any desired color. In another case, a plurality of filters having successively different colors may be mounted on the rotary disc 56 and the rotary disc 56 is rotated for the successive and free selection of the color. In order to have a conspicuous variation in color, it is desirable that the converted visible light 41 has any one of the three primary colors, blue, green and red, and that the biasing light 60 has any one of the other two colors of the three primary colors.

In the present embodiment, an X-ray sensitive fluorescent screen has been illustrated as an example of the means for converting an X-ray image into a visible image and displaying the image thereon. However, it will be apparent for those skilled in the art that any other suitable means such as a solid-state X-ray image converter comprising the combination of a photoconductive material and an electrically luminescent material or an X-ray image intensifier employing a photocathode may be used in lieu of the fluorescent screen.

What is claimed is:

1. A device for converting an X-ray image for the observation of the same comprising means for converting an X-ray image into a visible image and displaying the converted visible image on its display surface, and light source means for biasingly illuminating the image display surface with a beam of light bearing a color which differs from the color emitted from the display surface.

2. A device for converting an X-ray image for the observation of the same as claimed in claim 1, in which the light emitted from said X-ray image conversion and display means is selected to be one of the three primary colors, blue, green and red, and the light emitted from said light source means is one of the two remaining two colors.

3. A device for converting an X-ray image for the observation of the same as claimed in claim 1, in which a half mirror is disposed on the side nearer to the display surface of said X-ray image conversion and display means so that said half mirror reflects the colored light coming from said light source means and directs the light toward the display surface for biasingly illuminating the display surface of said X-ray image conversion and display means, whereby the visible image formed on the display surface can be viewed through said half mirror.

4. A device for converting an X-ray image for the observation of the same as claimed in claim 3, in which said light source means comprises an incandescent lamp connected with a power source generating variable voltage, and a color filter for the separation of the desired color from the incandescent light which is emitted from said incandescent lamp and passes through said filter.

5. A device for converting an X-ray image for the observation of the same as claimed in claim 4, in which said light source means comprises an incandescent lamp connected with a power source generating a variable voltage, and a plurality of kinds of color filters for the separation of the desired color from the incandescent light which is emitted from said incandescent lamp and passes through said filters, and means is provided to suitably change over said color filters so that the biasing light of varying color can be reflected by said half mirror to be projected on the display surface of said X-ray image conversion and display means.

6. A device for converting an X-ray image for the observation of the same as claimed in claim 1, in which said light source means comprises at least one of means for varying the color of the biasing light and means for varying the intensity of the biasing light.

References Cited

UNITED STATES PATENTS

| | | | |
|---|---|---|---|
| 3,014,130 | 12/1961 | Marchal et al. | 250—77 |
| 3,415,990 | 12/1968 | Watson | 250—77 |

A. R. BORCHELT, Primary Examiner

U.S. Cl. X.R.

250—78